United States Patent Office 2,769,672
Patented Nov. 6, 1956

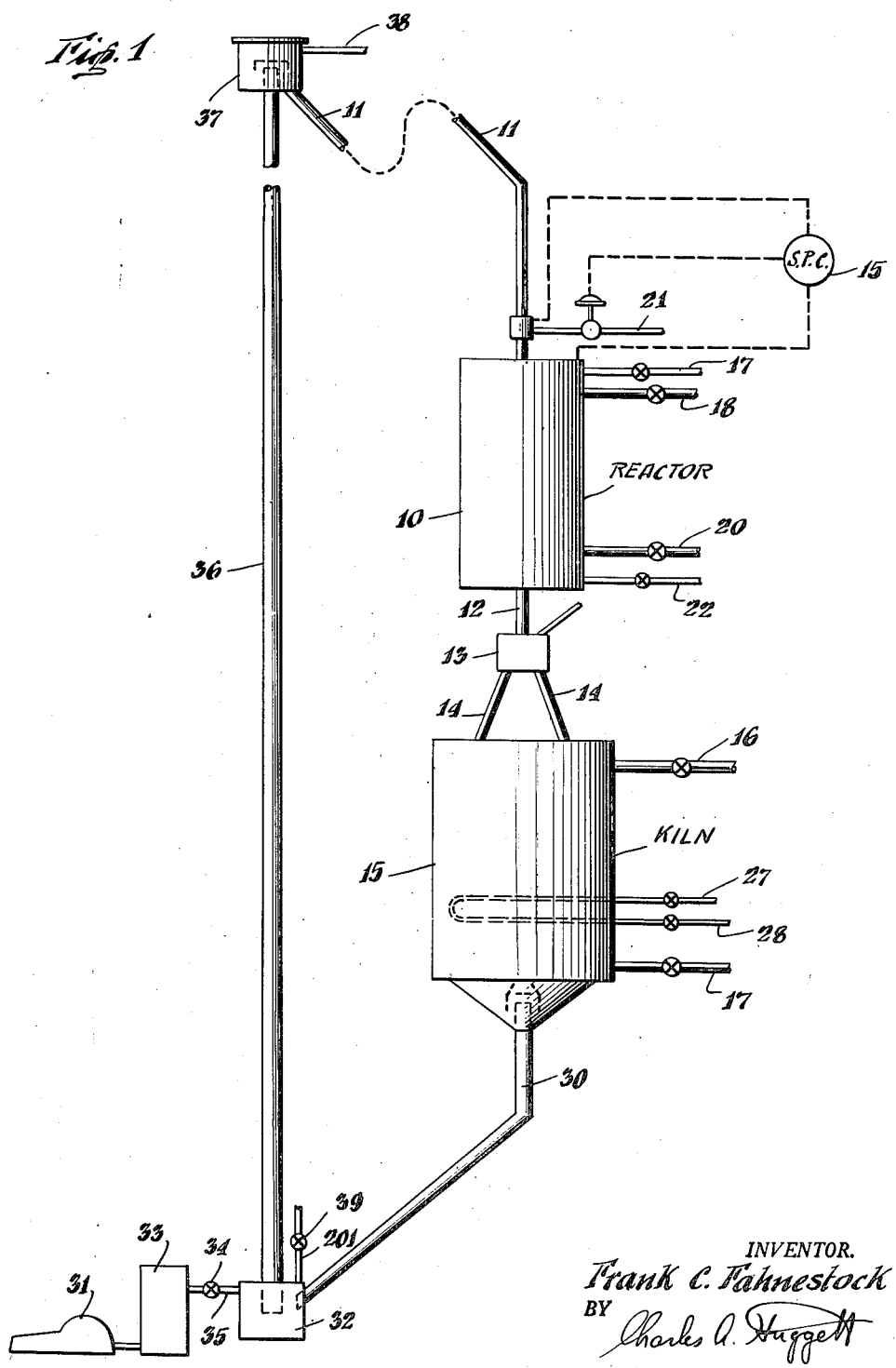

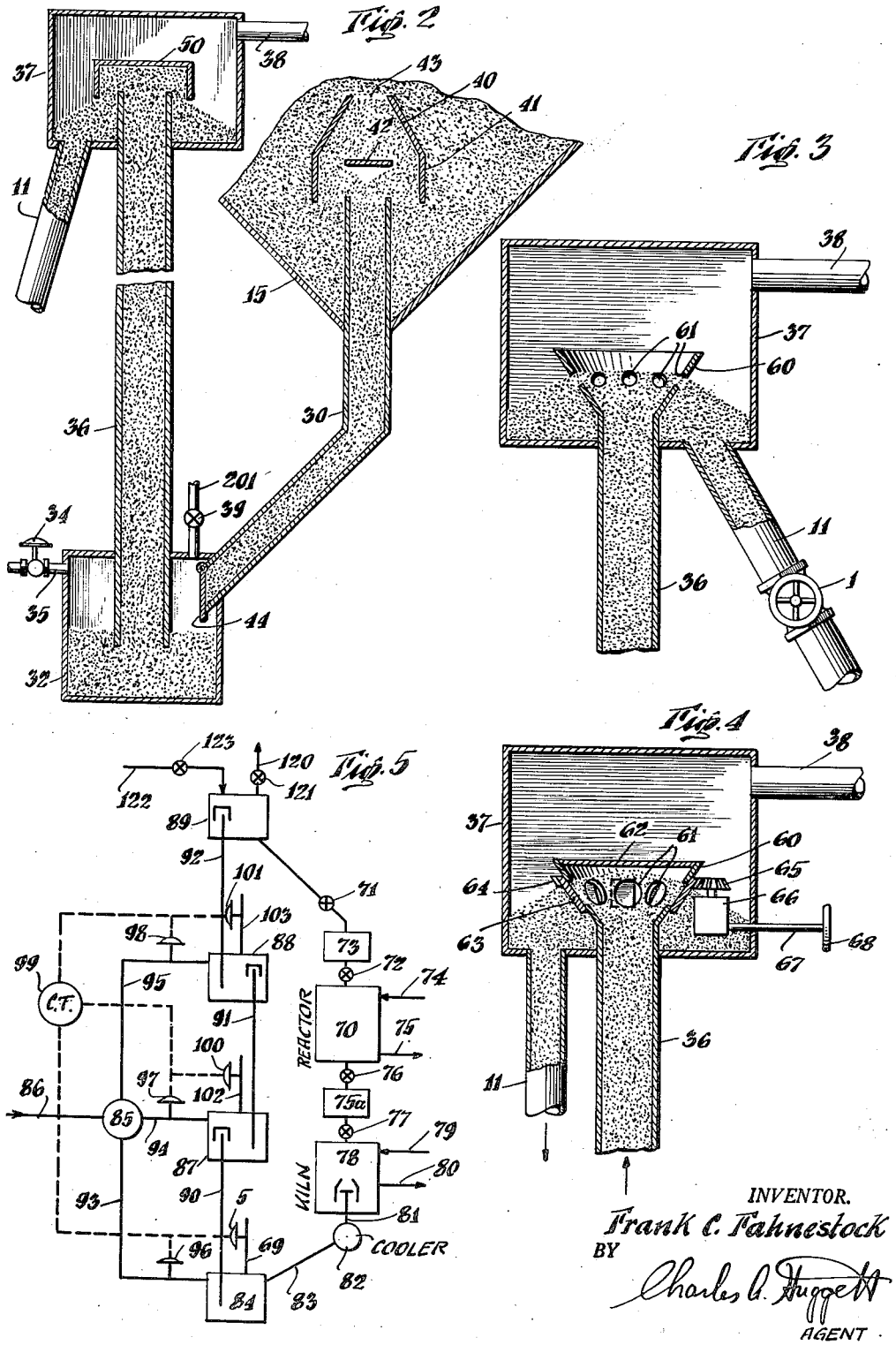

2,769,672

METHOD FOR PNEUMATICALLY LIFTING GRANULAR CONTACT MATERIAL

Frank C. Fahnestock, Manhasset, N. Y., assignor to Socony Mobil Oil Company, Inc., a corporation of New York Application April 21, 1952, Serial No. 283,453

6 Claims. (Cl. 302—53)

This invention deals with an improved method and apparatus for pneumatic transfer of granular contact materials from a given location to a higher location. It is particularly concerned with an improved solid flow lift for intermittently raising granular solids, useful in cyclic hydrocarbon conversion systems of the moving bed type.

The invention may be applied to such processes as catalytic cracking, isomerization, hydrogenation, dehydrogenation, hydrocracking, reforming either in the presence or absence of added hydrogen, hydroforming, aromatization, alkylation, cyclicizing, treating and desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually metallic compounds for specific purposes. When the contact material is employed principally for heat carrying purposes as in pyrolytic conversion processes, it may take the form of any of a number of refractory materials such as fused alumina, mullite, carborundum, zirconium oxide, charcoal, etc., for coking processes the solid material may comprise a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably for catalytic cracking from about 4–20 mesh by Tyler standard screen analysis. For other processes, other sized particles may be used. The density of the material as poured into a measuring container may be within the range about 20–130 pounds per cubic foot.

In continuous catalytic cracking systems the contact material is passed cyclically through a conversion zone wherein it contacts a hydrocarbon feed at pressures usually above atmospheric and temperatures of the order of 700–1100° F. whereby the feed is converted and then through a regeneration zone wherein a carbonaceous contaminant deposited on the catalyst in the conversion zone is removed by burning. When the granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, in earlier designs all commercial continuous catalytic cracking units of the compact moving bed type have involved side by side arrangement of reactor and kiln thereby requiring two elevators and have involved relatively low catalyst circulation rates. It has been found desirable to increase catalyst circulation rates in order to permit simplification of other parts of the system, particularly the kiln and to arrange the reactor and kiln in vertical series so as to require only a single catalyst transfer step per cycle. This could not be done practically with existing mechanical transfer devices. It had been proposed from time to time to effect the catalyst transfer by pneumatic catalyst transfer lifts but the use of pneumatic transfer in these cyclic conversion systems was prevented because of the very high catalyst attrition and breakage caused by the high velocity particles striking metal container walls or colliding with other particles. It has also been proposed to convey particles through a substantially vertical lift pipe in slugs of contact material in substantially compact form. This method of lifting the contact material in substantially compacted form required the application intermittently of high gas pressure to a feed chamber at the bottom of the lift. The term "solid flow lift" is used to indicate a lift which uses gas pressure to flow the granular solids upwardly through the lift pipe in substantially compacted form; each particle is supported by particles therebelow and there is continuous solid contact throughout the lift pipe. It was found that because of the high gas pressure differential across the supply conduit feeding the feed chamber a piston-like action occurred which forced solids upwardly out of the top of the supply conduit. Since the maintainance of a substantially compacted leg in the supply conduit was necessary to seal the feed chamber, this made the lift inoperable. The use of complicated locks or valves at the bottom of the supply conduit to prevent the escape of gas during the lifting cycle was considered highly undesirable. It was found also that for lifting the solids through a substantial elevation by this method exceedingly high pressures were required. The use of these high gas pressures was undesirable. Another difficulty found when using this method of lifting particles as a compact stream involved the excessive breakage of the solids at the top of the lift and the difficulty encountered in separating gas from solids. I have discoveerd a method and apparatus which overcomes these difficulties and makes it possible to lift slugs of solids upwardly through a solid flow lift with minimum gas pressure requirement, minimum deleterious effect upon the rest of the system and minimum breakage of particles.

It is an object of this invention to provide an improved solid flow lift for intermittently transferring granular solids from a given location to a higher location.

It is a further object of this invention to intermittently effect the transfer of granular solids in a continuous conversion moving bed system from a low point in the system to a high point in the system.

It is a further object of this invention to provide method and apparatus for effecting the solid flow transfer of granular solids in hydrocarbon conversion systems which overcomes the above-described difficulties.

These and other objects of the invention will become apparent from the following description of the invention, to be read in conjunction with the referenced sketches.

Figure 1 is an elevational view of a continuous conversion system incorporating the invention.

Figure 2 is an elevational view in section of a solid flow lift which diagrammatically illustrates the invention.

Figure 3 is a view in section of an alternate embodiment for disengaging the gas from the mass of contact material at the top of a solid flow lift.

Figure 4 shows in section another embodiment for disengaging the gas from the mass of contact material at the top of the solid flow lift.

Figure 5 is a highly diagrammatic showing of a multi-stage solid flow lift in a high pressure continuous reforming system.

Turning now to Figure 1, which is highly diagrammatic in form, there is shown a typical application of this invention in a cyclic continuous moving bed catalytic cracking system. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor through a gravity feed leg 11, which may be of the type disclosed and claimed in the United States Patent Number 2,410,309, and catalyst is withdrawn from the reactor via conduit 12 from which it flows through branch conduits 14 to the upper end of a catalyst regenerator 15. When the contact material is under pressure, it may be depressurized in a depressurizer 13 at the bottom of conduit 12. The withdrawal system may be similar to that now disclosed and claimed in United States Patent No. 2,546,625 which issued March 27, 1951. Vaporized hydrocarbon feed, for example, a 500–900° F. gas oil cut, may enter the upper section of the reactor via pipe 17. The feed may be preheated in a heater, not shown, to a temperature of the order of 700–900° F. A suitable high boiling liquid hydrocarbon feed may be supplied the reactor via pipe 18, either cold or in preheated condition. The internal liquid feed arrangement may be similar to that disclosed in Patent No. 2,574,850, issued November 13, 1951. The cracked lower boiling gaseous hydrocarbon products may be withdrawn from the lower section of the reactor via pipe 20. The internal arrangement associated with pipe 20 may be similar to that disclosed and claimed in United States Patents 2,458,498 and 2,459,096. A suitable inert seal gas such as steam or flue gas may be supplied to an upper seal zone in the reactor or to a separate seal pot in the feed leg 11 via pipe 21. The rate of seal gas supply is maintained by differential pressure controller 15 sufficient to control the pressure in the seal zone slightly above that in the reaction zone proper. Similarly, a seal and purge gas is admitted into the lower section of the reactor via pipe 22 to purge gaseous hydrocarbons from the effluent catalyst. It should be understood that the word "gaseous" as employed herein is intended in a broad sense as covering materials in the gaseous phase under the particular operating conditions involved regardless of what may be the phase of such materials under ordinary atmospheric conditions. The reactor may be operated at a pressure near or somewhat above or below that in the kiln. When the reactor pressure is substantially above that in the kiln it may be desirable to provide a depressurizing zone in the chamber 13.

The kiln 15 is provided with an air inlet 16 at the top and flue gas outlet 17 at the bottom. A bank of cooling tubes is provided in the lower section of the kiln supplied with a suitable cooling liquid or gas via pipe 27. Cooling fluid leaves these tubes via pipe 28. Suitable internal arrangements for kilns are disclosed and claimed in the various patents covering the moving bed hydrocarbon conversion processes, a particularly suitable kiln being shown and described in application Serial Number 186,953, filed in the United States Patent Office September 27, 1950, now Patent No. 2,695,220, issued November 23, 1954, and Serial Number 186,954, filed in the United States Patent Office September 27, 1950.

The catalyst passes from the kiln 15 via pipe 30 as a compact stream delivering onto a compact bed in the lift chamber 32. The top of the conduit 30 is projected into the lower end of the kiln 15 and is associated with various baffles, shown in more detail on Figure 2 and described in more detail hereinafter. An air compressor 31 is used to provide a suitable gas pressure in the storage chamber 33. When the catalyst level in the chamber 32 rises to its maximum point the valve 34 in conduit 35 is opened and a substantial gas pressure admitted to the chamber. The gas pushes the contact material up through the lift pipe 36 in substantially compacted form into the receiving vessel 37, raising the level of the catalyst in that vessel. The gas escapes from the vessel 37 through the discharge conduit 38. When the catalyst stops flowing through the lift pipe, the valve 34 is closed and the gas pressure is relieved by opening valve 39 in conduit 201. The feeding chamber 32 is then refilled with catalyst.

The invention is disclosed in more detail on Figure 2 in which like parts are given similar numbers. The conduit 30 is shown projected upwardly into the bottom of the supply vessel 15. Above the open top of the conduit 30 is located a frusto-conical ring baffle 40 having a cylindrical skirt 41 which is terminated on its lower end at about the same level as the top of conduit 30. Directly above the top of the conduit and within the ring baffle is located a substantially horizontal plate or baffle 42. In its preferred form the plate 42 is substantially equal in area to the cross-section of the pipe 30 and is located at least ½ a pipe diameter above the top of the pipe. The cross-sectional area enclosed by the lower end of the conical baffle is broadly about 3–8 times the cross-sectional area of the pipe 30 and preferably should be about 4–5 times that area. The side wall of the conical baffle should be broadly between 30–45 degrees with the vertical and should be terminated at the upper end so that there is enclosed an area about 1–2 times the cross-sectional area of the pipe 30. In preferred form, the angle of the side walls of the ring baffle is about 35–38 degrees from the vertical and the area enclosed by the top of the baffle is about 1–1¼ times the cross-section of the supply pipe 30. In a less preferred form of the invention, the ring baffle 40 may be eliminated, the weight of the catalyst column in the vessel 15 thereabove cooperating with the plate 42 to accomplish the desired function.

In operation, catalyst enters the top opening 43 of the ring baffle 40 and fills the region under the baffle. Catalyst flows around the edge of the horizontal plate 42 leaving a void directly under the plate. This void surface is defined by lines drawn downwardly and inwardly from the edge of the plate at the angle of repose of the catalyst. The angle of repose depends somewhat upon the size and shape of the particles involved, and may range from about 30–45 degrees for particles usually used in conversion processes. For most granular cracking catalysts the angle is about 35–38 degrees. The plate 42 should be at least far enough above the pipe 30 so that at least 1 inch of catalyst covers the entire top of the pipe. This arrangement provides unrestricted downward flow of solids through the baffles and into the conduit 30. The solids will flow into the vessel 32 until the level of the mass of solids rises and covers the lower end of the pipe 30. The solids flow through pipe 30 may thus automatically be stopped by the catalyst itself. It is preferred, however, that the level of solids be stopped in an intermediate position by admitting high pressure gas to the vessel 32. Detail 44 is a cover hinged at the top designed to cover the lower end of pipe 30. The catalyst readily pushes the cover open but any tendency for gas to flow back through the pipe 30 will close the cover. This cover is added as additional precaution and is not necessary for the successful operation of this invention.

When the catalyst has risen to the desired level in the chamber 32, the valve 34 is opened, automatically or by hand, and high pressure lift gas is introduced into the chamber 32. The gas prevents the admission of any additional catalyst into the chamber 32 and pushes the catalyst in the chamber up the lift pipe 36 as a compacted mass. However, unless efforts are taken to prevent the upward movement of solids in the supply conduit, the gas pressure will produce some movement of the bed in the supply vessel 15 permitting some catalyst to be forced upward and out of the leg 30. This reduces the effective length of the seal and allows an increased amount of gas to flow from chamber 32 upwardly through the leg 30. The cumulative effect results in the catalyst in the leg acting as a piston and displacing catalyst above it until the effective seal is lost. When this happens the lift becomes inoperative. In my apparatus the horizontal plate or baffle 42 blocks the upward movement of the particles and by virtue of the flow characteristics which solid particles exhibit causes the forces which would tend to lift the catalyst to be exerted upwardly and outwardly along the projection of the angle of repose of the contact material beneath the plate 42. An inverted conical plug of the solids is held motionless under the plate 42 by the upward gas flow, the wall of the cone being at the angle of repose of the contact material. The forces are exerted against the sloping walls at approximately right angles with the walls. This in effect prevents any substantial movement of catalyst up the leg 30 and maintains it in position. The walls of the conical baffle 40 slope inwardly at an angle with the horizontal which is substantially the complement of the angle of repose of the catalyst. Therefore, the forces act against the sloping walls at approximately right angles to the walls. This, in effect, prevents any substantial movement of catalyst up the leg 30, thereby maintaining a suitable gas seal. The compacted bed thus maintained within the leg 30 provides a substantial gas pressure drop, serving as a seal to prevent the escape of any substantial portion of the gas from the chamber 32 other than through the lift pipe 36. The cylindrical skirt 41 prevents the lateral movement of the catalyst. Since the annular space between the skirt baffle and the top of the pipe is large in comparison to the cross-sectional area of the pipe, a large portion of the gas passing through the conduit 30 travels downwardly into the bed of catalyst in the vessel 15 at substantially reduced velocity. This prevents the buildup of localized streams of high velocity gas through the opening 43 which might otherwise have the effect of causing movement of the bed at this point.

Turning to the receiving vessel 37, it is found essential to the operation of the mass flow lift that some means be afforded of preventing the particles from discharging upwardly from the lift pipe at high velocity. In Figure 2 an inverted cup type baffle 50 is located over the top of the lift pipe. The baffle is located far enough above the pipe to prevent throttling of the flow, which would reduce the capacity of the lift. This requires that the baffle be located at least ½ a pipe diameter above the lift. If the baffle is located too far above the lift, however, it will not be effective in maintaining the catalyst in substantially compacted form and the performance of the lift will be unsatisfactory. The proper location of this baffle for any given lift and set of operating conditions may require some variation to allow for the properties of the material handled but ½ a pipe diameter above the lift is a preferred starting point. The diameter of the cup baffle skirt should be about twice the diameter of the lift pipe, but this also may vary in regard to optimum size.

The catalyst, during lifting, flows over the side of the pipe 36 and fills the bottom of the chamber 37 up to the level of the cup baffle. When this level is reached the flow will automatically stop. The upwardly moving gas has a substantially reduced velocity in the vessel 37 because of the greatly enlarged cross-sectional area of the vessel over that of the lift pipe. The cross-section of the vessel 37 is made large enough so that the upward gas velocity in the vessel is below the terminal velocity of the catalyst, viz. that velocity at which the catalyst particle starts to move upwardly. The gas, therefore, disengages from the catalyst bed. The gas is withdrawn through the conduit 38 and catalyst can be continuously withdrawn from the vessel 37 through the conduit 11 to supply the reactor with a steady stream of catalyst. The next lifting cycle is timed to occur before the vessel 37 is emptied of catalyst.

The operation of the solid flow lift may be intermittent as hereinabove described or continuous. For intermittent operation one feed tank 32 is used whereas for continuous operation two or more tanks 32 and lift pipes 36 are used in cycle. In operation, the tank 32 is depressurized to a level equal to the pressure in vessel 15 by opening the valve 39 so that the gas can escape from the tank 32 through the pipe 201. The catalyst then flows by gravity into the tank 32, pushing aside the flapper 44, until the level in the tank builds up sufficiently to stop the catalyst flow or until the desired filling time has elapsed. When the flow stops the conduit 30 is left full of contact material which serves as a seal leg. In the preferred form of the invention, the upper portion of the conduit 30 is substantially vertical and the lower end is disposed at an angle of about 45 degrees with the horizontal. The valve 39 is closed and pressure is applied to the tank to lift the solids upwardly through the conduit 36. The flow may be controlled by means of a valve in the conduit 11 or therebelow, so that the rate of withdrawal regulates the amount which is lifted in one cycle. The operation is controlled so that the leg 36 is always full of catalyst and the tank 32 is depressurized via the vent pipe 201 at the end of each cycle. During the blow cycle gas pushes the flapper 44 against the end of the pipe so that the resistance of the seal leg to gas flow will be greater.

Figure 3 shows an alternate arrangement for the disengagement of gas and catalyst. A funnel-shaped outlet 60 is attached to the upper end of the lift pipe. The walls of the outlet 60 slope outwardly at an acute angle so that the top of the outlet encloses a large portion of the cross-section of the vessel 37. A series of apertures 61 is located intermediate the top and bottom of the outlet, uniformly distributed thereabout. The gas velocity is rapidly reduced during the upward passage of the gas through the outlet because of the rapid lateral expansion of the gas stream. Therefore, the particles move upwardly to the level of the apertures 61 in substantially compacted form and are not ejected in any substantial amount out of the top of the outlet in separated form. The particles pass through the apertures 61 and fill the vessel up to the level of the apertures. When that level is reached the flow of catalyst ceases. The top of the lift may be curved outwardly from the vertical gradually instead of abruptly, as shown in Figure 3, thereby effecting a more gradual reduction of the gas velocity at the top of the lift. The gas velocity at the top must be reduced by lateral expansion of the gas stream below the terminal velocity of the catalyst, so that the catalyst in the lift remains in substantially compacted form.

Figure 4 discloses an embodiment of the invention slightly modified from that shown on Figure 3. A cover 62 is located above the funnel 60 forcing all the gas to escape through the orifices 61. A collar 63 is located about the funnel 60 at the level of the apertures 61. The collar 63 has rectangular apertures spaced uniformly about the collar so that when the collar is rotated to bring the apertures in the collar in alignment with the apertures in the funnel 60, all apertures in the funnel will be open. The collar 63 has a gear 64 on its outer surface which mates with the pinion gear 65. The gear box 66 is connected to the pinion gear 65 and also to a handle 68 outside the vessel via the shaft 67. By rotating the handle 68 the flow of solids through the orifices 61 can be reduced. This provides suitable flow control for maintaining the leg 36 in compacted form.

Referring to Figure 5, there is shown a multistage solid flow lift which can be used to elevate catalyst in substantially compacted form through a substantial elevation without requiring excessive gas pressure. The system may be that of high pressure reforming in the presence of moving masses of catalyst. Catalyst is introduced into the reactor 70 against considerable pressure, e. g., 100–200 p. s. i. (gauge) by means of suitable valves 71, 72 and pressure chamber 73. Low boiling hydrocarbons, and if desired, other fluids, such as hydrogen, are introduced through conduit 74 and reformed material removed from the vessel through conduit 75. Another pressure chamber 75a and valves 76, 77 are used to remove a portion of the contact material periodically, thereby providing a mass of catalyst in the reactor which remains at a substantially constant activity level. Other means known in the art may be used for introducing and removing catalyst from the high pressure vessel. The catalyst is gravitated through the kiln 78 where it is contacted with combustion supporting gas introduced through the conduit 79. The flue gas is withdrawn from the vessel through the conduit 80.

The particles are withdrawn from the bottom of the kiln 78 through the conduit 81 and passed through a cooler 82 whereby the temperature of the mass is adjusted. The particles are then gravitated into the chamber 84 through the conduit 83. Baffles are arranged at the top end of the conduit 81, as taught by this invention, so that upward gas flow from the chamber 84 through the conduits 83 and 81 is substantially prevented. High pressure gas is introduced into the gas storage vessel 85 through the conduit 86. The chambers 84, 87, 88 and 89 are located in substantially vertical alignment by substantially vertical lift pipes 90, 91 and 92. The gas storage vessel is connected to chambers 84, 87 and 88 by the conduits 93, 94 and 95. The valves 96, 97 and 98 in conduits 93, 94 and 95 are automatically operated in sequence by the cycle timer 99. In addition, the valves 5, 100 and 101 in exhaust lines 69, 102, 103 from the chambers 84, 87 and 88 are automatically operated by the cycle timer so that when valves 97 and 98 are closed, valves 100 and 101 are open.

In operation, the tank 84 is depressurized upon releasing gas through the vent 69 by opening the valve 5. Catalyst then flows from the kiln 78 to the tank 84. The valve 5 is closed and the valve 96 opened to introduce high pressure gas into the tank 84. The capacity of the tank 87 below the stop place is no greater than that of the tank 84, so that at the end of the blowing step the catalyst level in tank 84 is still above the lower end of pipe 90. This leaves the pipe 90 full of catalyst and the catalyst acts as a seal when the pressure is raised on the tank 87. After the catalyst has been blown from tank 84 to tank 87, tank 84 is depressurized via vent 69 and catalyst again flows from kiln 78 to tank 84. While this is occurring, the pressure is raised on tank 87 and catalyst is blown up to tank 88. During this period tank 87 is at a high pressure and tank 84 is at a low pressure, the catalyst leg in pipe 90 serving as a seal leg between the two tanks. The capacity of tank 88 is similarly related to that of tank 87, as the capacity of tank 87 is related to tank 84 so that pipe 91 is always full of catalyst and acts as a seal leg when tank 88 is blowing and tank 87 is filling. This same relationship is maintained between tanks 89 and 88.

The flow of catalyst from tank 89 may be intermittent, occurring only after tank 89 has been depressurized. Tank 89 is depressurized by allowing gas to escape through the conduit 120. Alternatively, tank 89 may be depressurized to a pressure near that in the reactor 70. In a typical operation, the vessel 70 may be a reformer or cracker at 150 p. s. i. The kiln 78 may be operated at 5 p. s. i. The tank 84 is depressurized to about 5 p. s. i. and is subsequently pressured to about 30 p. s. i. to push the catalyst into tank 87. Tank 87 is maintained at about 0–5 p. s. i. when filling and at about 30 p. s. i. when blowing. Tank 88 likewise operates between 0–30 p. s. i. Tank 89 is at 0–5 p. s. i. when filling. When emptying tank 89 may also be at 0–5 p. s. i., in which case tank 73 is operated as a pressure lock feed system, the necessary piping being conventional. But also, if desired, after tank 89 is filled, it may be pressured by opening valve 123 in line 122 to about 150½ p. s. i. and catalyst then flows to reformer surge tank 73, also maintained at 150½ p. s. i. and then to the reformer 70 by gravity. A depressuring leg is provided between the reformer 70 and the kiln 78, which may be a suitable pressure lock, such as vessel 75.

It should be understood that this invention covers all modifications and changes of the examples, herein chosen to illustrate the invention for purposes of disclosure, which do not constitute departures from the spirit and scope of the invention.

I claim:

1. An improved method of lifting granular contact material which comprises: gravitating contact material downwardly as a substantially compact gravitating mass in a supply zone, withdrawing contact material downwardly from the bottom of the supply zone through an elongated passage of restricted cross-section to a confined zone, as long as the pressure in said confined zone is low, baffling the flow of solids above and adjacent the upper end of the elongated passage, so as to cause the solids to enter said passage from a lateral direction, increasing the pressure in said confined zone to force solids upwardly through a confined lift passage to a second confined zone at a higher elevation than said first confined zone, restricting the discharge velocity of the granular material at the upper end of the lift passage to a low enough value to maintain the material in compact flowing condition, reducing the pressure in said first confined zone before the first zone is entirely empty, whereby the lift passage remains filled with a substantially compact column of granular material and the first confined zone is refilled, and transferring solids from said second confined zone to provide space for the next slug of contact material.

2. An improved method of lifting granular contact material which comprises: gravitating contact material downwardly as a substantially compact gravitating mass in a supply zone, withdrawing contact material downwardly from the bottom of the supply zone through an elongated substantially vertical passage of restricted cross-section, the lower end of said passage being located at an angle of about 40–45 degrees with the horizontal and connecting with a first confined zone, baffling the flow of solids just above and adjacent the upper entrance to said elongated passage, so as to cause the solids to enter said passage from a lateral direction, intermittently increasing the pressure in said first confined zone to force solids upwardly through a confined lift passage to a second confined zone at a higher elevation than said first confined zone, restricting the discharge velocity of the granular material at the upper end of the lift passage to a low enough value to maintain the material in compact flowing condition, reducing the pressure in said first confined zone before the first zone is entirely empty, whereby the lift passage remains filled with a substantially compact column of granular material and the first confined zone is refilled, and transferring solids from said second confined zone to provide space for the next slug of contact material.

3. An improved method of lifting granular contact material which comprises: gravitating contact material downwardly as a substantially compact mass in a supply zone, withdrawing contact material downwardly from the bottom of the supply zone through an elongated substantially vertical passage of restricted cross-section, the lower end of the passage being bent to an angle of about 45 degrees with the horizontal and connecting with a first confined zone, baffling the flow of solids above and adjacent the upper entrance to said elongated passage, so that the column of gravitating solids in the supply zone is restricted to a cross-section substantially equal to the cross-section of the solids in the restricted passage at a location directly above the upper end of the passage and then expanded laterally, so as to form a frusto-conical column of solids, the exterior of said conical column disposed at approximately the complement of the angle of repose of the contact material with the horizontal, baffling the flow of the solid material before it is introduced into the upper end of the elongated passage, so that it travels laterally and downwardly into the elongated passage from beneath the exterior of the conical column, intermittently increasing the pressure in said first confined zone to force solids upwardly through a confined lift passage to a second confined zone at a higher elevation than said first confined zone, restricting the discharge velocity of the granular material at the upper end of the lift passage to a low enough value to maintain material in compact flowing condition, and transferring solids from said second confined zone to provide space for the next slug of contact material.

4. An improved method for lifting granular solid contact material which comprises: gravitating solid material downwardly as a substantially compact bed, withdrawing solid material downwardly from the bottom of the bed in the form of an elongated downwardly extending column of substantially compact solid material of restricted cross-section, and gravitating the solid material from the bottom of the column into a first confined zone, baffling the flow of solids adjacent the upper end of the column and across the entire horizontal area directly above the upper end of the column, increasing the pressure in said first confined zone to force solids up through a first confined lift passage to a second confined zone at a higher elevation than said first confined zone, the pressure differential across the column being at least sufficient to disrupt the compactness of the column and maintaining the bed on top of said column of sufficient cross-section and depth to prevent the column from being disrupted, limiting the discharge velocity of the solid material at the upper end of the first passage sufficient to maintain the solid material in the passage in compact form, reducing the pressure in said first zone before the first zone is entirely empty, whereby the first lift passage remains filled with a substantially compact column of granular material and the first confined zone is refilled, at the same time increasing the pressure in the second zone to force solids up through a second confined lift passage to a third confined zone at a higher elevation than said second confined zone, limiting the discharge velocity of the solid material at the upper end of the passage sufficient to maintain the solid material in the passage in compact form and withdrawing granular material from said third confined zone.

5. An improved method for lifting granular solid contact material which comprises: gravitating solid material downwardly as a substantially compact bed, withdrawing solid material downwardly from the bottom of the bed in the form of an elongated downwardly extending column of substantially compact solid material of restricted cross-section, and gravitating the solid material from the bottom of the column into a first confined zone, baffling the flow of solids adjacent the upper end of the column and across the entire horizontal area directly above the upper end of the column, increasing the pressure in said first confined zone to force solids up through a first confined lift passage to a second confined zone at a higher elevation that said first confined zone, the pressure differential across the column being at least sufficient to disrupt the compactness of the column and maintaining the bed on top of said column of sufficient cross-section and depth to prevent the column from being disrupted, expanding the upper end of said first passage an amount sufficient to maintain the solid material in the passage in compact form, reducing the pressure in said first zone before the first zone is entirely empty, whereby the first lift passage remains filled with a substantially compact column of granular material and the first confined zone is refilled, at the same time increasing the pressure in the second zone to force solids up through a second confined lift passage to a third confined zone at a higher elevation than said second confined zone, expanding the upper end of said second passage an amount sufficient to maintain the solid material in the passage in compact form, and withdrawing granular material from said confined zone.

6. An improved method for lifting granular solid contact material which comprises: gravitating solid material downwardly as a substantially compact bed, withdrawing solid material downwardly from the bottom of the bed in the form of an elongated downwardly extending column of substantially compact solid material of restricted cross-section, and gravitating the solid material from the bottom of the column into a first confined zone, baffling the flow of solids adjacent the upper end of the column and across the entire horizontal area directly above the upper end of the column, increasing the pressure in said first confined zone to force solids up through a confined lift passage to a second confined zone at a higher elevation than said first confined zone, the pressure differential across the column being at least sufficient to disrupt the compactness of the column and maintaining the bed on top of said column of sufficient cross-section and depth to prevent the column from being disrupted, expanding the upper end of said passage an amount sufficient to maintain the solid material in the passage in compact form, reducing the pressure in said first zone before the zone is entirely empty, whereby the lift passage remains filled with a compact column of granular material and the first confined zone is refilled and withdrawing granular material from said second confined zone.

References Cited in the file of this patent

UNITED STATES PATENTS

| | | |
|---|---|---|
| 2,221,741 | Vogel-Jorgensen | Nov. 12, 1940 |
| 2,509,983 | Morrow | May 30, 1950 |
| 2,546,625 | Bergstrom | Mar. 27, 1951 |
| 2,561,771 | Ardern | July 24, 1951 |
| 2,610,093 | Bergman | Sept. 9, 1952 |
| 2,616,521 | Berg | Nov. 4, 1952 |
| 2,643,161 | Shirk | June, 23, 1953 |
| 2,649,340 | Weinrich | Aug. 18, 1953 |
| 2,684,390 | Bills | July 20, 1954 |
| 2,684,870 | Berg | July 27, 1954 |
| 2,684,928 | Berg | July 27, 1954 |
| 2,684,930 | Berg | July 27, 1954 |
| 2,684,931 | Berg | July 27, 1954 |
| 2,684,932 | Berg | July 27, 1954 |
| 2,693,395 | Berg | Nov. 2, 1954 |
| 2,694,605 | Berg | Nov. 16, 1954 |

FOREIGN PATENTS

| | | |
|---|---|---|
| 268,667 | Great Britain | Apr. 7, 1927 |